United States Patent
Li et al.

(10) Patent No.: US 7,069,009 B2
(45) Date of Patent: Jun. 27, 2006

(54) APPARATUS AND METHOD FOR ALLOCATING RESOURCES OF A VIRTUAL CELL IN AN OFDM MOBILE COMMUNICATION SYSTEM

(75) Inventors: Jun Quiang Li, Yongin-shi (KR); Yung-Soo Kim, Songnam-shi (KR); Byung-Jang Jeong, Yongin-shi (KR)

(73) Assignee: Samsung Electronics Co., Ltd (KR)

( * ) Notice: Subject to any disclaimer, the term of this patent is extended or adjusted under 35 U.S.C. 154(b) by 248 days.

(21) Appl. No.: 10/673,524

(22) Filed: Sep. 29, 2003

(65) Prior Publication Data

US 2004/0127223 A1    Jul. 1, 2004

(30) Foreign Application Priority Data

Sep. 30, 2002 (KR) ...................... 10-2002-0059622

(51) Int. Cl.
*H04Q 7/20* (2006.01)
(52) U.S. Cl. .................. 455/446; 455/422.1; 455/447; 455/449; 455/450; 370/329; 370/341; 370/431
(58) Field of Classification Search ................ 455/446, 455/447, 449, 422.1, 450; 370/329, 341, 370/431
See application file for complete search history.

(56) References Cited

U.S. PATENT DOCUMENTS

| | | | |
|---|---|---|---|
| 6,285,874 B1* | 9/2001 | Magnusson et al. | 455/456.1 |
| 6,477,367 B1* | 11/2002 | Kim | 455/423 |
| 6,735,451 B1* | 5/2004 | Jarleholm et al. | 455/561 |
| 6,760,593 B1* | 7/2004 | Driessen | 455/500 |
| 2002/0055356 A1 | 5/2002 | Dulin et al. | |

(Continued)

FOREIGN PATENT DOCUMENTS

EP    1 185 001 A3    8/2003

(Continued)

OTHER PUBLICATIONS

S. B. Weinstein, "Data Transmission by Frequency-Division Multiplexing Using the Discrete Fourier Transform", IEEE Transactions on Communication Technology, vol. com-19, No. 5, Oct. 1972, pp. 628-634.

(Continued)

*Primary Examiner*—Lester G. Kincaid
*Assistant Examiner*—Khai Nguyen
(74) *Attorney, Agent, or Firm*—Dilworth & Barrese, LLP

(57) ABSTRACT

A virtual cell management apparatus and method using sectors in an orthogonal frequency division multiplexing mobile communication system including a cell structure having cells each comprised of a plurality of sectors, the cells performing data communication with mobile terminals within a corresponding cell through at least one subchannel having orthogonality. The method comprises forming a virtual cell with a particular one of sectors constituting a particular cell and sectors of two other cells neighboring the particular sector; transmitting, by three base stations forming the virtual cell, an interference measurement value and a channel parameter estimation value from a mobile terminal located in the virtual cell to a base station controller that controls the virtual cell, thereby allocating wireless resource including frequency bandwidth, initial bits, subcarriers and refined bits in the virtual cell; transmitting the allocated wireless resource to the three base stations so that the base stations allocate a same subchannel to each mobile terminal located in the virtual cell; and transmitting same data over the allocated subchannel.

9 Claims, 11 Drawing Sheets

U.S. PATENT DOCUMENTS

2002/0122461 A1* 9/2002 Hervey et al. .............. 375/132
2003/0078043 A1* 4/2003 Horwath et al. ............ 455/436
2003/0129984 A1* 7/2003 Dent .......................... 455/446
2004/0014472 A1* 1/2004 de La Chapelle et al. .. 455/429

FOREIGN PATENT DOCUMENTS

WO     WO 02/049385 A2    6/2002
WO     WO 02/049385 A3    6/2002

OTHER PUBLICATIONS

European Search Report dated Feb. 9, 2004 issued in a counterpart application, namely, Appln. No. 03078041.5.

* cited by examiner

APPARATUS AND METHOD FOR ALLOCATING RESOURCES OF A VIRTUAL CELL IN AN OFDM MOBILE COMMUNICATION SYSTEM

PRIORITY

This application claims priority under 35 U.S.C. § 119 to an application entitled "Apparatus and Method for Allocating Resource of Virtual Cell in an OFDM Mobile Communication System" filed in the Korean Industrial Property Office on Sep. 30, 2002 and assigned Serial No. 2002-59622, the contents of which are incorporated herein by reference.

BACKGROUND OF THE INVENTION

1. Field of the Invention

The present invention relates generally to an apparatus and method for managing a virtual cell in an OFDM mobile communication system, and in particular, to an apparatus and method for managing resources of a virtual cell.

2. Description of the Related Art

In general, orthogonal frequency division multiplexing (hereinafter referred to as "OFDM") can be defined as a two-dimensional access technology, a combined technology of time division access (TDA) and frequency division access (FDA). Therefore, in OFDM data transmission, OFDM symbols are separately carried on corresponding subcarriers (or subchannels).

OFDM has high spectrum efficiency because spectra of subchannels overlap with one another while maintaining mutual orthogonality. A modulation/demodulation scheme can be realized with an efficient digital device since OFDM modulation/demodulation is realized by inverse fast Fourier transform (IFFT) and fast Fourier transform (FFT). In addition, the OFDM technology, because it is robust against frequency selective fading or narrowband interference, is effective for the current European digital broadcasting transmission and high-speed data transmission, and has been adopted as standard specification for a high-capacity wireless communication system, such as IEEE 802.11a, IEEE 802.16a, and IEEE 802.16b.

OFDM is a type of a multicarrier modulation (MCM) technology that converts a serial input symbol stream into parallel symbols and then modulates the parallel symbols with a plurality of orthogonal subcarriers before transmission.

A system supporting MCM was first applied to high frequency wireless communication for military use late in the 1950's, and a system supporting OFDM (hereinafter referred to as "OFDM system"), in which a plurality of orthogonal subcarriers overlap with one another was developed in the 1970's. There was a limitation on application of OFDM to an actual system, because orthogonal modulation among multiple carriers must be realized. However, as discussed by Weinstein et al. in an article entitled "Data Transmission by Frequency-Division Multiplexing Using the Discrete Fourier Transform" in IEEE Transactions on Communications, Volume: 19 issue 5, October 1971 (pages: 628–634) OFDM modulation/demodulation can be efficiently performed using discrete Fourier transform (DFT), the OFDM technology has developed rapidly. In addition, as a method of using a guard interval and inserting a cyclic prefix guard interval is known, it is possible to reduce the influence of multipath fading and delay spread on the system. As a result, OFDM is widely applied to digital transmission technologies such as digital audio broadcasting (DAB), digital television (TV), wireless local area network (W-LAN), and wireless asynchronous transfer mode (W-ATM). That is, OFDM has not been widely used due to its high hardware complexity, but the recent development of various digital signal processing technologies including FFT and IFFT make it possible to realize OFDM. The OFDM technology, being similar to the conventional frequency division multiplexing (FDM) technology, is characterized by transmitting high-speed data while maintaining orthogonality among a plurality of subcarriers, thereby securing optimum transmission efficiency. In addition, OFDM has high frequency efficiency and is robust against multipath fading, thus securing optimum transmission efficiency during high-speed data transmission. Particularly, since frequency spectra overlap with one another, OFDM has high frequency efficiency and is robust against frequency selective fading and multipath fading. Further, according to OFDM, inter-symbol interference (ISI) can be reduced using a guard interval and an equalizer can be simply designed by hardware. In addition, OFDM is positively applied to a communication system because it is robust against impulsive noises.

An existing OFDM mobile communication system having the above-stated characteristics fixes time and frequency channels allocated to users, like an OFDM-TDMA (Time Division Multiple Access) or OFDM-FDMA (Frequency Division Multiple Access) cellular mobile communication system. That is, in the existing OFDM mobile communication system, a user supporting the OFDM technology and the TDMA or FDMA technology transmits OFDM data by TDMA or FDMA. In this case, the same frequency bands are reused by a plurality of cells in order to increase frequency efficiency. The extent of the frequency reuse is determined by a frequency reuse factor. Commonly, the frequency reuse factor becomes 3, 4, or 7. Therefore, frequency reuse efficiency is not that high (a frequency reuse factor is larger than 1) due to a fixed channel allocation technology, and a fixed subchannel allocation technology shows a poor bit error rate (BER) due to frequency selective fading.

In addition to a system employing the fixed channel allocation, wideband wireless access technologies based on a method of equalizing the influence of interference, such as a band division multiple access (BDMA) technology and a multicarrier code division multiple access technology have been proposed. The interference equalization is achieved by diversity effect of interference occurring due to inter-cell random frequency hopping and spread spectrum technologies. The interference equalization technology shows higher capability than the fixed channel allocation technologies such as OFDM-TDMA and fixed OFDM-FDMA. However, the interference equalization technology cannot completely realize advantages of multicarrier modulation such as multiuser diversity and adaptive resource allocation with channel information in base stations (BSs). An interference avoidance technology such as dynamic channel allocation can show 2 or 3 times higher capability than the interference equalization technology in terms of frequency efficiency. Therefore, a combination of the OFDM technology and a dynamic subchannel allocation technology based on a multi-antenna technology, adaptive modulation, and an interference avoidance technology with low complexity, remarkably reduces the influence of deep fading and co-channel interference (CCI) while increasing frequency efficiency and system capacity.

FIG. 1 illustrates a method of reusing frequencies of each cell in a general mobile communication system supporting fixed OFDM-FDMA (hereinafter referred to as "fixed OFDM-FDMA mobile communication system"). Specifically, FIG. 1 illustrates an example of carrier frequencies used in respective cells, wherein a carrier frequency used in each cell is reused by other cells except in directly adjacent cells. Therefore, in FIG. 1, a frequency reuse factor becomes 3. Herein, an allocated bandwidth is divided into three bandwidths, and a deterministic scheme, i.e., a fixed channel allocation technology, is used in each cell.

FIG. 2 illustrates a transmission/reception scheme of each cell in a fixed OFDM-FDMA mobile communication system. Referring to FIG. 2, user data User#1, User#2, . . . , User#K to be transmitted to a plurality of users is applied to a fixed subcarrier allocator 210. The fixed subcarrier allocator 210 allocates at least one fixed subcarrier to the user data to be transmitted to each user (Fixed Subcarrier Allocation). The user data allocated at least one fixed subcarrier is provided to a modulation and IFFT conversion block 212, and the modulation and IFFT conversion block 212 modulates the user data by a predetermined modulation scheme and then performs IFFT conversion on the modulated user data. The IFFT-converted user data is provided to a cyclic prefix addition and parallel/serial (P/S) conversion block 214, and the cyclic prefix addition and P/S conversion block 214 inserts a cyclic prefix guard interval into the user data, converts the parallel user data into one serial user data stream, and then transmits the user data stream through a transmission antenna.

User data transmitted from each user after being processed in the above-stated process is received through a reception antenna. The received user data is provided to a cyclic prefix cancellation and serial/parallel (S/P) conversion block 220, and the cyclic prefix cancellation and S/P conversion block 220 converts the received user data into parallel user data, and cancels cyclic prefix guard intervals inserted in the user data. The user data output from the cyclic prefix cancellation and S/P conversion block 220 is provided to an FFT block 222, and the FFT block 222 restores the user data and provides the restored user data to a demodulator 224. The demodulator 224 demodulates the restored user data and generates $k^{th}$ user data.

In the conventional transmission/reception scheme for the fixed OFDM-FDMA mobile communication system described in conjunction with FIG. 2, although the required number of calculations is reduced, frequency and power efficiencies are not high. Therefore, the fixed OFDM-FDMA mobile communication system has the following disadvantages.

First, if several subchannels of a particular user experience deep fading or interference due to fixed channel allocation being increased, BER performance will be poor.

Second, when a frequency reuse factor is 3, frequency efficiency is low. That is, because traffic for each cell is independent, a cell which is concentratedly accessed by users may reach its limitation on an amount of supportable traffic, unlike the adjacent cells, which are not concentratedly accessed by users. In this case, the cell that has reached its limitation on supportable traffic is unable to borrow the channels unused in the adjacent cells according to circumstances. Therefore, there are demands for a wireless access technology based on an adaptive resource allocation algorithm in which a frequency reuse factor approaches 1.

SUMMARY OF THE INVENTION

It is, therefore, an object of the present invention to provide a new wireless access apparatus and method for a wideband wireless OFDM system, for increasing frequency efficiency and power efficiency of a cellular mobile communication system.

It is another object of the present invention to provide an adaptive resource allocation apparatus and method for enabling a frequency reuse factor to approach 1 in a cellular mobile communication system.

It is further another object of the present invention to provide an apparatus and method for increasing performance by using space division and macro transmit diversity (MTD) to improve a frequency reuse characteristic in an cellular mobile communication system supporting adaptive resource allocation.

It is yet another object of the present invention to provide an apparatus and method for suppressing spatial interference by using multiple antennas and a suboptimum adaptive resource allocation algorithm in a wideband wireless OFDM cellular mobile communication system.

It is still another object of the present invention to provide an apparatus and method to enable a frequency reuse factor to approach to 1 and minimize an entire transmission power by increasing frequency and power efficiencies using a technology for reducing and suppressing interference.

It is still another object of the present invention to provide an apparatus and method for controlling three sectors forming a virtual cell by one base station controller and enabling a frequency reuse factor in each sector using multiple antennas to approach to 1. It is still another object of the present invention to provide an apparatus and method for suppressing interference in a pico cell and a macro cell by using a sectored antenna technology and a beamforming technology.

It is still another object of the present invention to provide an apparatus and method for minimizing transmission power by using a multistage suboptimum adaptive resource allocation algorithm for allocating bits and power to each user based on the number of subchannels of each user and Water filling.

It is still another object of the present invention to provide a macro transmit diversity apparatus and method using same transmission data and a method of previously using equalization, in order to increase performance of a user who transmits and receives a weak signal, located far away from a base station.

It is still another object of the present invention to provide an apparatus and method for a soft handover by applying macro transmit diversity to a mobile terminal located in a virtual cell.

It is still another object of the present invention to provide an apparatus and method for increasing frequency efficiency by using space division multiple access (SDMA) in a macro cell environment where different users can occupy the same subcarrier.

In accordance with a first aspect of the present invention, there is provided a virtual cell management method using sectors in an orthogonal frequency division multiplexing mobile communication system including a cell structure having cells each comprised of a plurality of sectors, the cells performing data communication with mobile terminals within a corresponding cell through at least one subchannel having orthogonality. The method comprises the steps of: forming a virtual cell with a particular one of sectors constituting a particular cell and sectors of two other cells neighboring the particular sector; transmitting, by three base stations forming the virtual cell, an interference measurement value and a channel parameter estimation value from a mobile terminal located in the virtual cell to a base station controller that controls the virtual cell, thereby allocating wireless resource including frequency bandwidth, initial bits, subcarriers, and refined bits in the virtual cell; transmitting the allocated wireless resource to the three base stations, enabling the base stations to allocate a same subchannel to each mobile terminal located in the virtual cell; and transmitting same data over the allocated subchannel.

In accordance with a second aspect of the present invention, there is provided an apparatus for allocating resources of a virtual cell formed with a particular sector forming a particular cell and sectors of other two cells neighboring the particular sector, in an orthogonal frequency division multiplexing mobile communication system having a cell structure formed by cells each comprised of a plurality of sectors, the cells performing data communication with mobile terminals within a corresponding cell through at least one subchannel having orthogonality. In the apparatus, mobile terminals located in the virtual cell transmit, to base stations, interference information measured during a power off of the base stations and channel information estimated using pilot signals from the base stations, and performs demodulation with at least one subchannel based on access information from the base stations. The base stations transmit interference information and channel information from the mobile terminals to a base station controller that controls the virtual cell, receive wireless allocation information from the base station controller, transmit the access information to the mobile terminals, allocate a same subchannel to each mobile terminal located in the virtual cell, and then transmit same data over the allocated subchannel. A resource allocator allocates frequency bandwidth, initial bits, subcarriers, and refined bits in the virtual cell based on the interference information and the channel information transmitted through the base station controller, and transmits the allocated wireless allocation information to the base stations through the base station controller.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Figure 1:
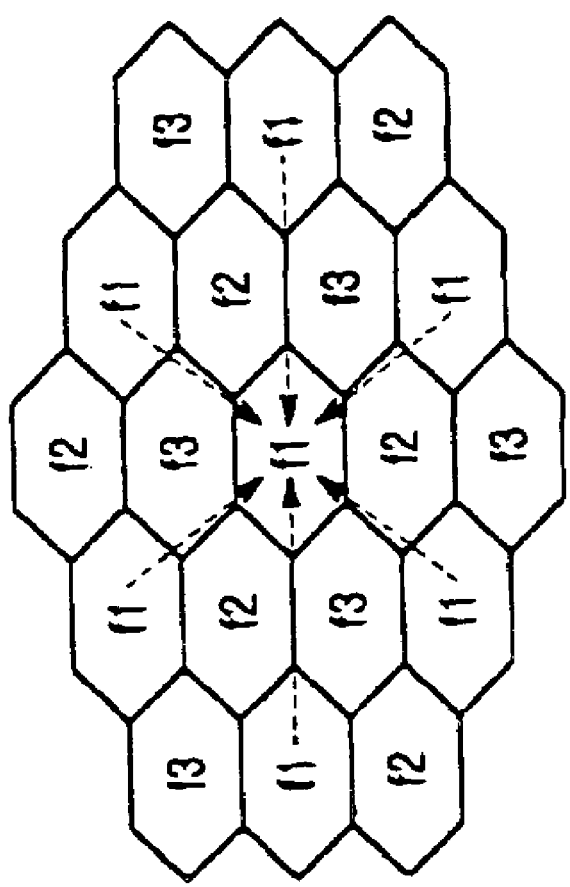
FIG. 1 illustrates a cell configuration in a conventional OFDM mobile communication system.
Figure 2:
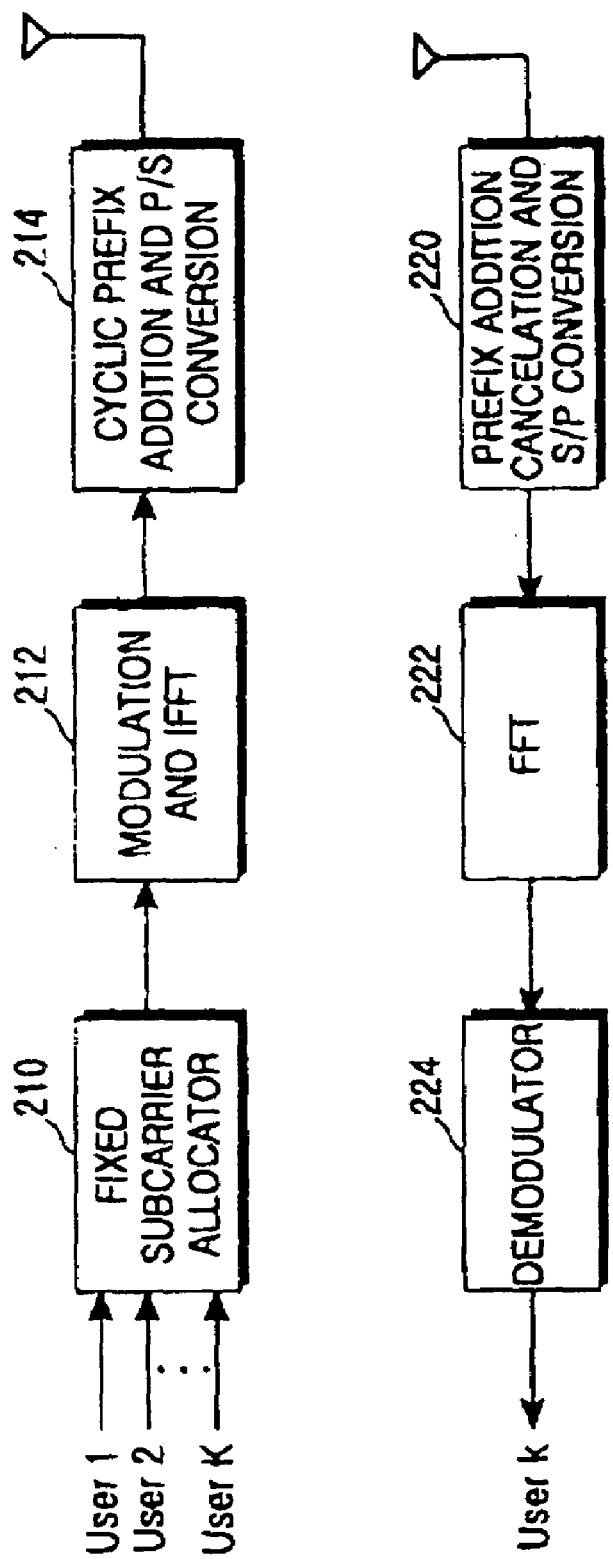
FIG. 2 illustrates a transmission/reception scheme in a conventional OFDM mobile communication system.

Several preferred embodiments of the present invention will now be described in detail hereinbelow with reference to the annexed drawings. In the drawings, the same or similar elements are denoted by the same reference numerals even though they are depicted in different drawings. In the following description, a detailed description of known functions and configurations incorporated herein has been omitted for conciseness.

The present invention provides a method of improving a diversity gain by introducing a virtual cell concept, and performing adaptive resource allocation and spatial interference suppression within a cell so as to conveniently manage frequencies and easily perform soft handover. In addition, the present invention proposes a new wireless access technology for a wideband wireless OFDM system to increase frequency efficiency and power efficiency. It is assumed herein that a base station previously knows a characteristic of an instantaneous downlink channel to mobile terminals. The characteristic of a downlink channel is measured from uplink channels received at a base station in a time division duplex (TDD) mode, and measured through feedback information (FBI) transmitted over uplink channels in a frequency division duplex (FDD) mode.

In order to measure the characteristic of a downlink channel, the present invention proposes a virtual cell and provides an adaptive resource allocation algorithm in each base station that forms the virtual cell.

1. Realization of Virtual Cell

The present invention will propose a new concept of a virtual cell comprised of three adjacent sectors, all of which are controlled by one base station controller. The adjacent sectors constituting the virtual cell are separately formed by three different base stations.

Figure 3:
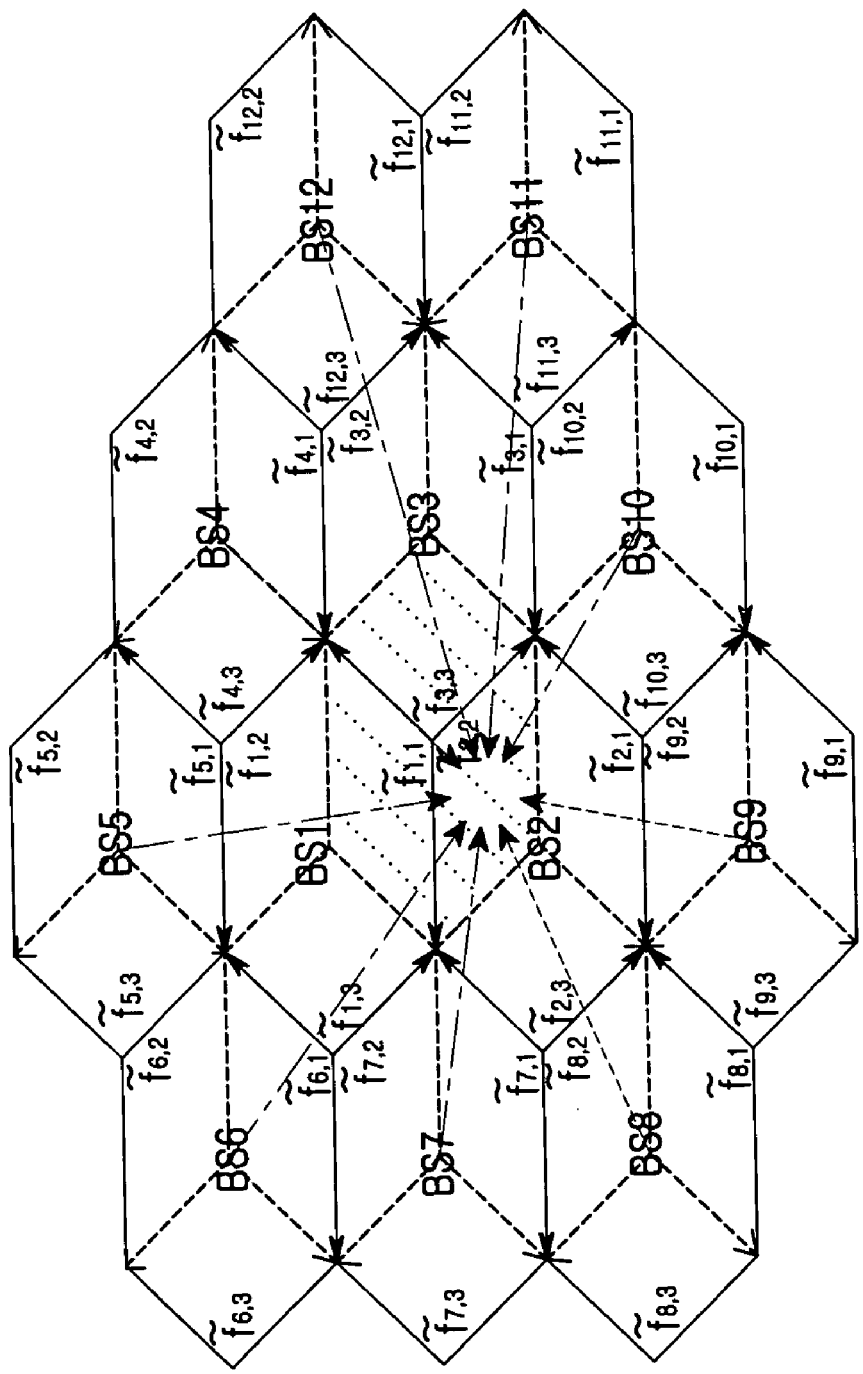
FIG. 3 illustrates a concept of a virtual cell in an OFDM mobile communication system according to an embodiment of the present invention.

FIG. 3 illustrates a concept of a virtual cell in an OFDM mobile communication system according to an embodiment of the present invention. Referring to FIG. 3, each of cells constituting the entire cell corresponds to a particular one of base stations BS#1 to BS#12, and the respective cells are allocated different frequency resources. For example, a cell of a base station BS#1 is allocated a frequency resource $\bar{f}_1$, a cell of a base station BS#2 is allocated a frequency resource $\bar{f}_2$, and a cell of a base station BS#3 is allocated a frequency resource $\bar{f}_3$. The cells formed by their associated base stations are divided into three sectors through a directional antenna, and the sectors each are allocated different frequency resources having orthogonality. For example, the sectors formed by the base station BS#1 are allocated frequency resources $\bar{f}_{1,1}$, $\bar{f}_{1,2}$ and $\bar{f}_{1,3}$, the sectors formed by the base station BS#2 are allocated frequency resources $\bar{f}_{2,1}$, $f_{2,2}$ and $f_{2,3}$, and the sectors formed by the base station BS#3 are allocated frequency resources $f_{3,1}$, $f_{3,2}$, and $f_{3,3}$. In FIG. 3, a sector included in common in three adjacent cells is defined as a virtual cell (see a hatched section). For example, the virtual cell is realized with a sector (using the frequency resource $f_{1,1}$) adjacent to the base stations BS#2 and BS#3 among the sectors of the base station BS#1, a sector (using the frequency resource $f_{2,2}$) adjacent to the base stations BS#1 and BS#3 among the sectors of the base station BS#2, and a sector (using the frequency resource $f_{3,3}$) adjacent to the base stations BS#1 and BS#2 among the sectors of the base station BS#3. The virtual cell is controlled by three base stations that manage three sectors included in the virtual cell. Therefore, a mobile terminal existing in the virtual cell is allocated wireless resource from a base station corresponding to the sector to which the mobile terminal itself belongs, among the three sectors included in the virtual cell. For example, the virtual cell represented by hatching lines is controlled in common by the base stations BS#1, BS#2, and BS#3, and a mobile terminal located in a sector belonging to the base station BS#1 among the three sectors included in the virtual cell is allocated wireless resource from the base station BS#1.

Generally, in a cellular mobile communication system, because an available frequency bandwidth is limited, frequencies are reused so long as the system is not affected by co-channel interference received from downlink co-channel cells, in order to increase frequency efficiency. Therefore, a frequency of the virtual cell should also be reused as long as the system is not affected by the co-channel interference. That is, a base station controller, which controls the virtual cell, allocates frequencies to active mobile terminals within the virtual cell according to feedback information on size and channel condition of an interference signal for the entire frequency bandwidth F. In order to measure co-channel interference of the active mobile terminals in the virtual cell, it is necessary to measure all downlink signals transmitted from all neighboring cells or the base stations constituting the virtual cell. A base station desiring to measure the interference signal must suspend transmission of a downlink signal. The downlink co-channel interference is measured at a particular time slot. When the virtual cell is used as described above, the entire frequency band can be reused even in a virtual cell adjacent to a particular virtual cell. Subcarriers can be dynamically allocated to active mobile terminals, which are independent from an adjacent virtual cell. In a particular case, if all sectors must support the same traffic, three sectors in the virtual cell equally allocate the entire bandwidth so that CCI is generated only from the base stations BS#8 and BS#9. However, traffic is unevenly generated in the sectors and the CCI is chiefly received at random from the base stations BS#4 and BS#12. In this case, the CCI to all active mobile terminals is decreased due to the interference avoidance technology.

Contrary to the existing FDM cell scheme with a frequency reuse factor of 3 or 7, a multicell scheme according to an embodiment of the present invention has a frequency reuse factor that approaches 1.

Figure 4:
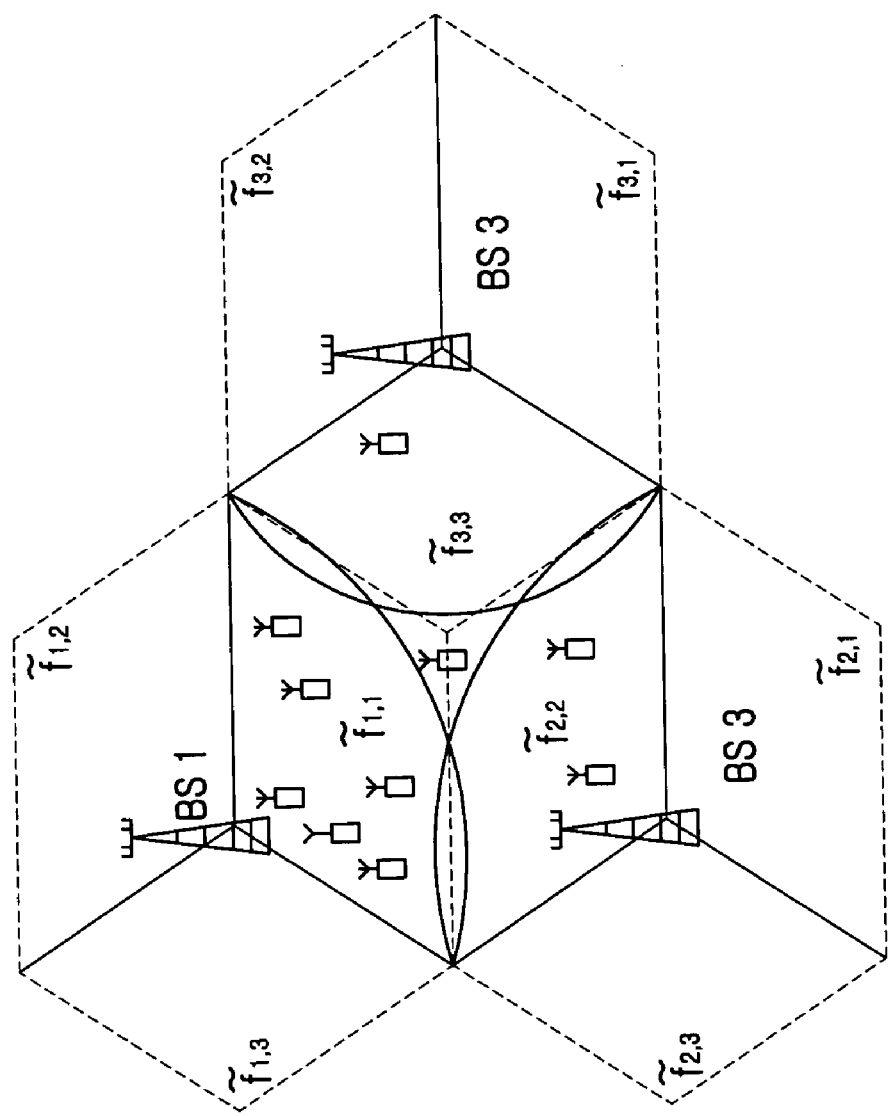
FIG. 4 illustrates an example of active mobile terminals distributed in a virtual cell according to an embodiment of the present invention.

FIG. 4 illustrates an example of active mobile terminals distributed in a virtual cell according to an embodiment of the present invention. As illustrated in FIG. 4, distribution of active mobile terminals located in the virtual cell is different according to sectors constituting the virtual cell. That is, distribution of the active mobile terminals located in a sector controlled by the base station BS#1 is highest, while distribution of the active mobile terminals located in a sector controlled by the base station BS#3 is lowest. In order to efficiently allocate frequencies over the entire frequency bandwidth, some of wireless resources managed in the sector where distribution of active mobile terminals is relatively lower, are allocated to a base station for a sector where distribution of the active mobile terminals is relatively higher.

For this purpose, the entire bandwidth of the mobile communication system must be adaptively allocated by the active mobile terminals according to a channel characteristic of all active mobile terminals in the virtual cell. Meanwhile, the entire frequency bandwidth is reused in adjacent virtual cells. Due to multiuser diversity where a statistical characteristic and interference on all links existing among a plurality of base stations and mobile terminals are independent of one another, there is a low probability that all links of one subcarrier experience deep fading or have high CCI. Therefore, if channel information and information on fast interference measurement are given, it is possible to adaptively allocate resources while satisfying a bit rate and a required QoS (Quality of Service) for various services for all active mobile terminals in the virtual cell. By doing so, the frequency reuse factor approaches 1 and high frequency efficiency due to high power efficiency is secured by dynamic subcarrier allocation based on interference avoidance, adaptive modulation, and power control.

2. Virtual Cell Resource Allocation

A description will now be made of an OFDM technology employing selective source allocation.

In the virtual cell defined above, a subcarrier experiencing deep fading or strong CCI due to the use of multiuser diversity and adaptive modulation is not used. However, a particular subcarrier does not experience deep fading or strong interference between a plurality of base stations and mobile terminals in the virtual cell. This is because statistical characteristic of fading is independent of statistical characteristic of interference. Therefore, in the virtual cell, it is possible to adaptively allocate frequency channels, bits, and power of all active users according to the extent of nose and interference. However, because it is difficult to complete a proper algorithm for optimizing the entire cell network, the present invention restricts a multistage suboptimum adaptive resource allocation algorithm in order to independently realize subcarrier allocation, bit allocation, and power control in one independent virtual cell.

2.1 System Architecture

Figure 5:
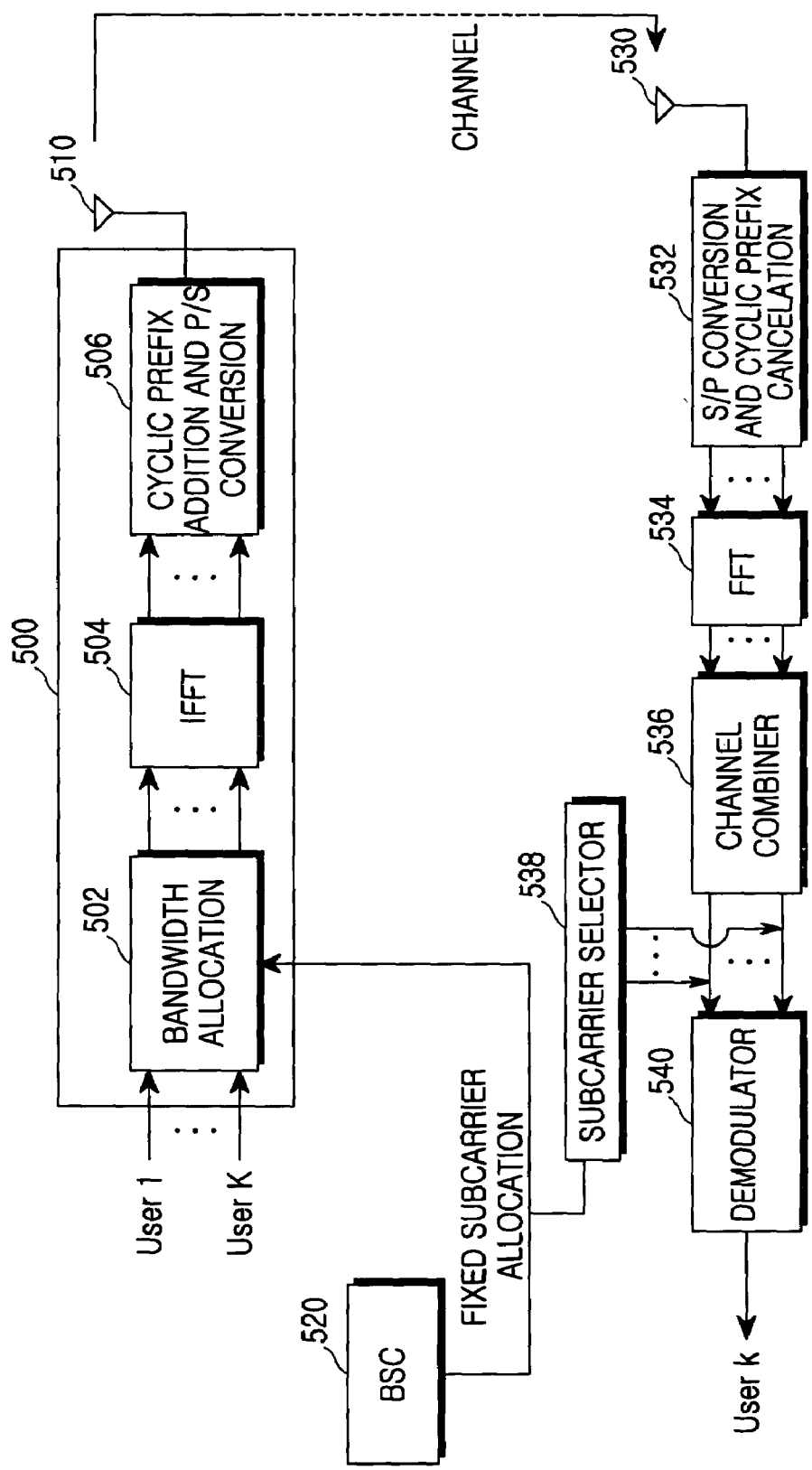
FIG. 5 illustrates system architecture for adaptive resource allocation in an OFDM mobile communication system according to an embodiment of the present invention.

FIG. 5 illustrates system architecture for allocating resources of a virtual cell in an OFDM mobile communication system according to an embodiment of the present invention. The system includes a base station transmitter 500, a base station receiver, and a base station controller (BSC) 520. The base station transmitter 500 is comprised of a bandwidth allocator 502, an IFFT block 504, and a cyclic prefix addition and parallel/serial (P/S) conversion block 506. The base station receiver is comprised of a serial/parallel (S/P) conversion and cyclic prefix cancellation block 532, an FFT block 534, a channel combiner 536, a subcarrier selector 538, and a demodulator 540.

Referring to FIG. 5, the bandwidth allocator 502 receives data User#1 thru User#K to be transmitted to each of active mobile terminals located in the same virtual cell and fixed subcarrier allocation information delivered from the base station controller 520, and allocates a bandwidth to the data to be transmitted to each of the active mobile terminals based on the fixed subcarrier allocation information. The IFFT block 504 performs IFFT modulation on the data output from the bandwidth allocator 502. The cyclic prefix addition and P/S conversion block 506 adds a cyclic prefix to the IFFT-converted data, and converts the cyclic prefix-added parallel data into serial data. The converted serial data is transmitted through an antenna 510.

The data transmitted from mobile terminals located in the same virtual cell is received through an antenna 530. The S/P conversion and cyclic prefix cancellation block 532 converts the received serial data into parallel data, and cancels a cyclic prefix added to the converted parallel data. The FFT block 534 performs FFT on the cyclic prefix-canceled parallel data, and generates restored data. The channel combiner 536 combines the restored data according to channel. The subcarrier selector 538 selects subcarriers based on fixed subcarrier allocation information provided from the base station controller 520. The demodulator 540 demodulates the data provided from the channel combiner 536 based on the selected subcarriers provided from the subcarrier selector 538, and generates user data User#K.

Figure 9:
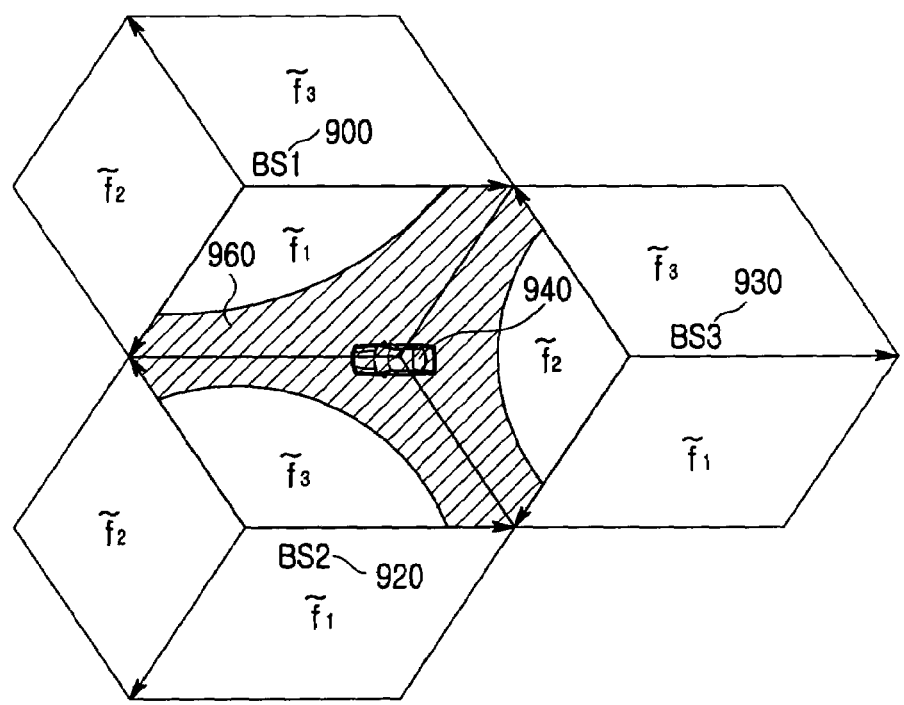
FIG. 9 illustrates a method of applying transmit diversity in a virtual cell according to an embodiment of the present invention.

However, a mobile terminal located in the hatched region of FIG. 9 should be able to receive separate downlink signals from three base stations BS#1 (900), BS#2 (920), and BS#3 (930), and perform transmit diversity on the received downlink signals.

Figure 6:
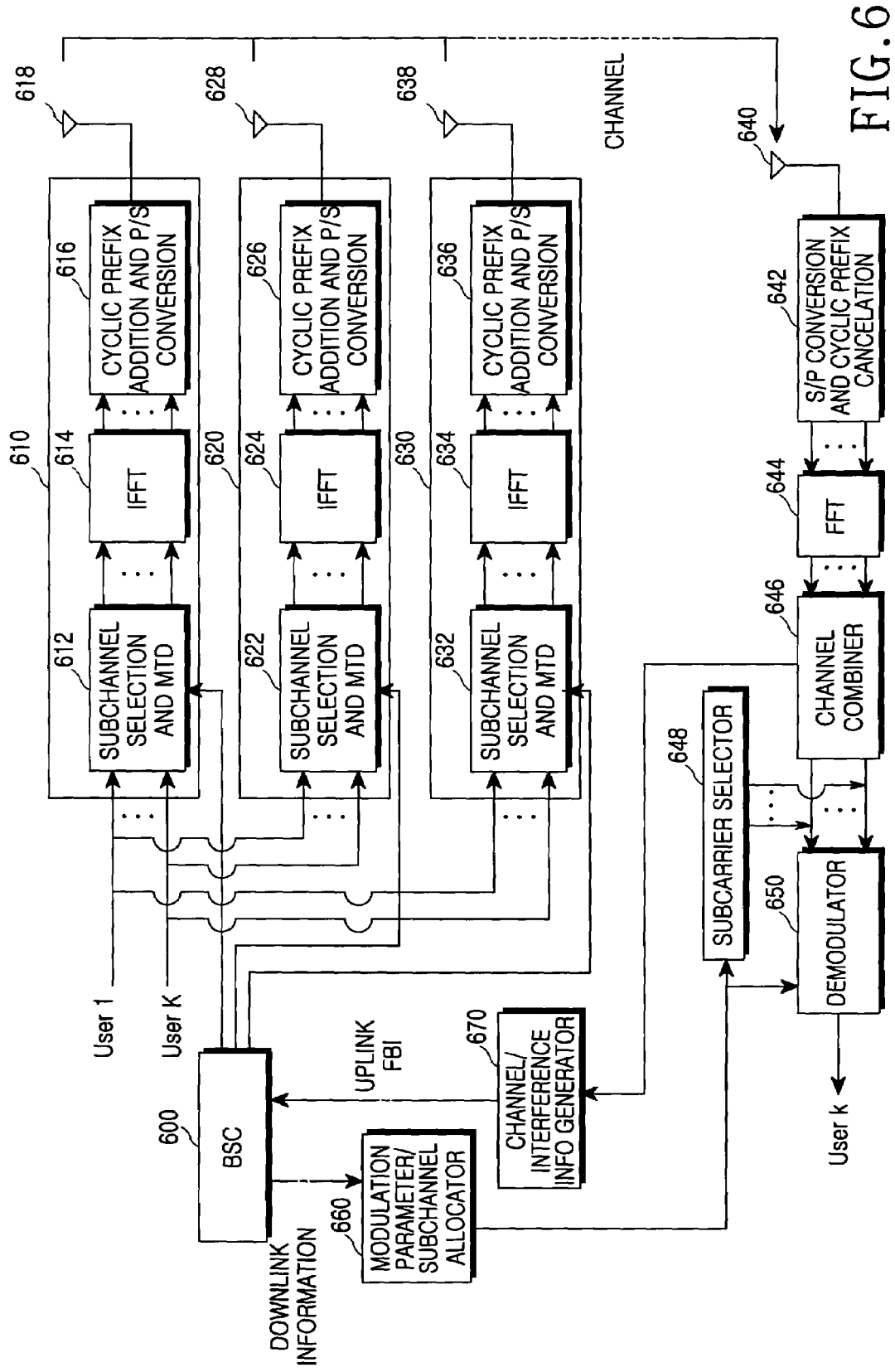
FIG. 6 illustrates system architecture for performing adaptive resource allocation considering transmit diversity in an OFDM mobile communication system according to an embodiment of the present invention.

FIG. 6 illustrates system architecture for separately allocating resources of respective cells while supporting transmit diversity in an OFDM mobile communication system according to an embodiment of the present invention. The system illustrated in FIG. 6 includes a plurality of the transmitters illustrated in FIG. 5 in parallel, and each transmitter transmits a downlink signal through its own antenna. Each transmitter in FIG. 6 corresponds to each of three base stations forming the same virtual cell. The system further includes a modulation parameter/subchannel allocator 660, and a channel/interference information generator 670. The transmitter of FIG. 6 is identical in structure and operation to the transmitter of FIG. 5. The receiver of FIG. 6 is also identical in structure and operation to the receiver of FIG. 5.

The newly added elements will now be described with reference to FIG. 6. The modulation parameter/subchannel allocator 660 allocates modulation parameters and subchannels based on downlink information provided from a base station controller (BSC) 600, and provides its output to a subcarrier selector 648. The channel/interference information generator 670 generates channel and interference information based on channel information provided from a channel combiner 646 of the receiver, and provides its output to the base station controller 600 as uplink feedback information (FBI).

Figure 7:
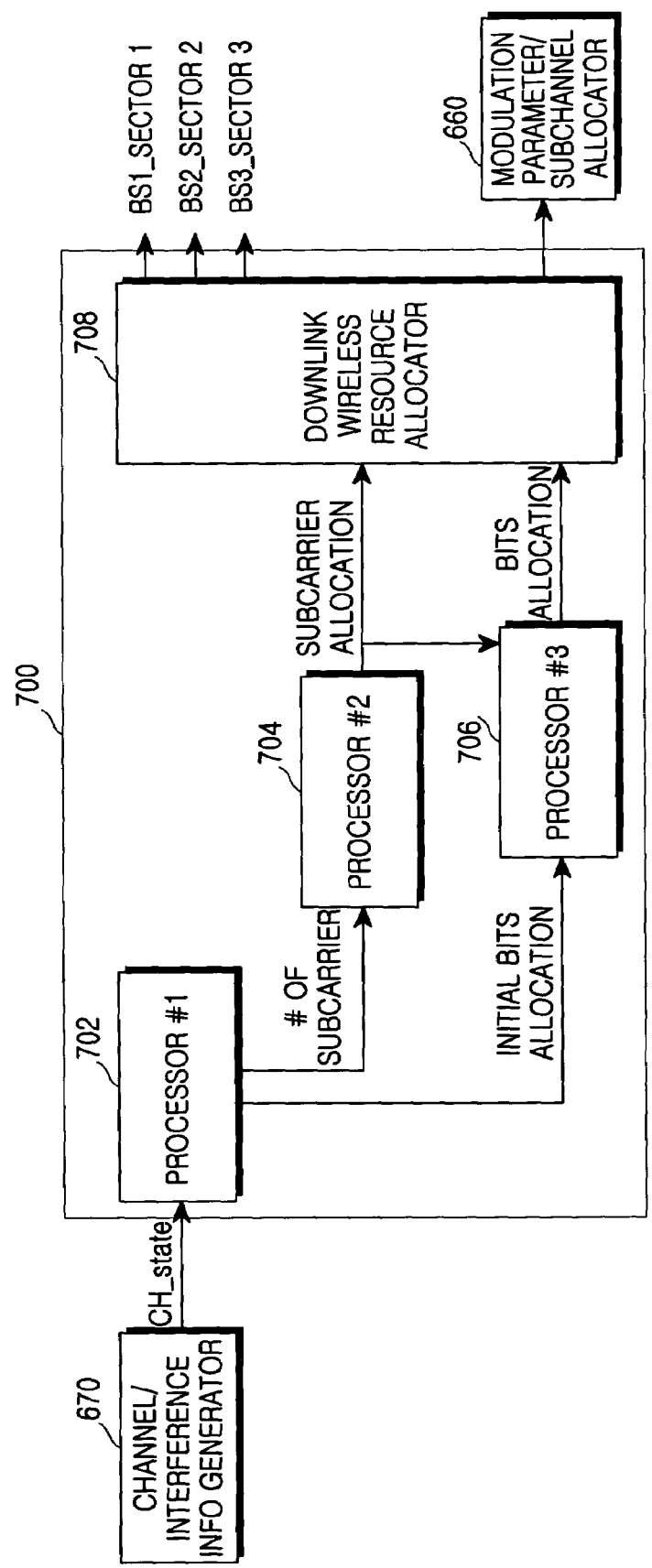
FIG. 7 illustrates a detailed structure of the base station controller illustrated in FIG. 6.
Figure 8:
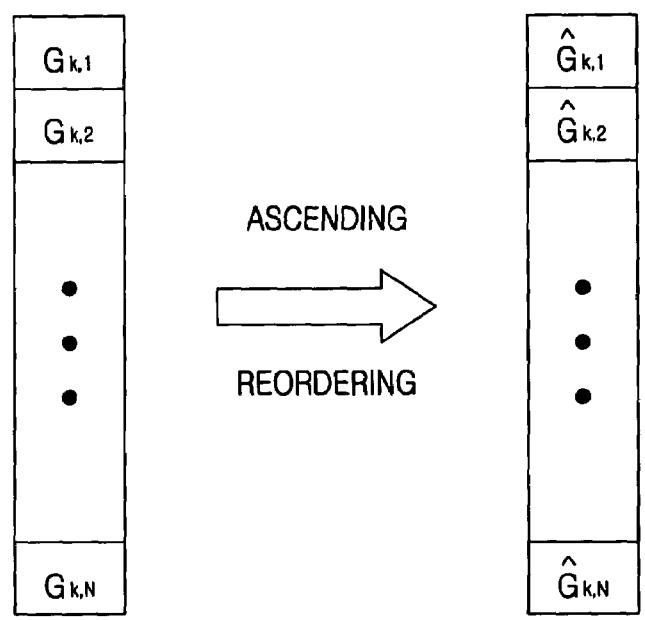
FIG. 8 illustrates a method of rearranging subchannels by a plurality of mobile terminals according to an embodiment of the present invention.

FIG. 7 illustrates a detailed structure of the base station controller in FIGS. 5 and 6. In FIG. 7, the base station controller includes first to third processors 702, 704, and 706, and a downlink wireless resource allocator 708.

Referring to FIG. 7, the first processor 702 receives channel/interference information from the channel/interference information generator 670, and allocates a subcarrier number designating a subcarrier and initial bits based on the channel/interference information. The second processor 704 receives the subcarrier number, and allocates a subcarrier corresponding to the subcarrier number. The third processor 706 receives the initial bits and the subcarrier, and allocates bits based on the initial bits and the subcarrier. The downlink wireless resource allocator 708 receives the allocated subcarrier and bits, and allocates wireless resources to active mobile terminals located in the virtual cell based on the allocated subcarrier and bits. Information on the wireless resources allocated by the downlink wireless resource allocator 708 is provided to the modulation parameter/subchannel allocator 660.

2.2 Virtual Cell Resource Allocation Procedure

Figure 10:
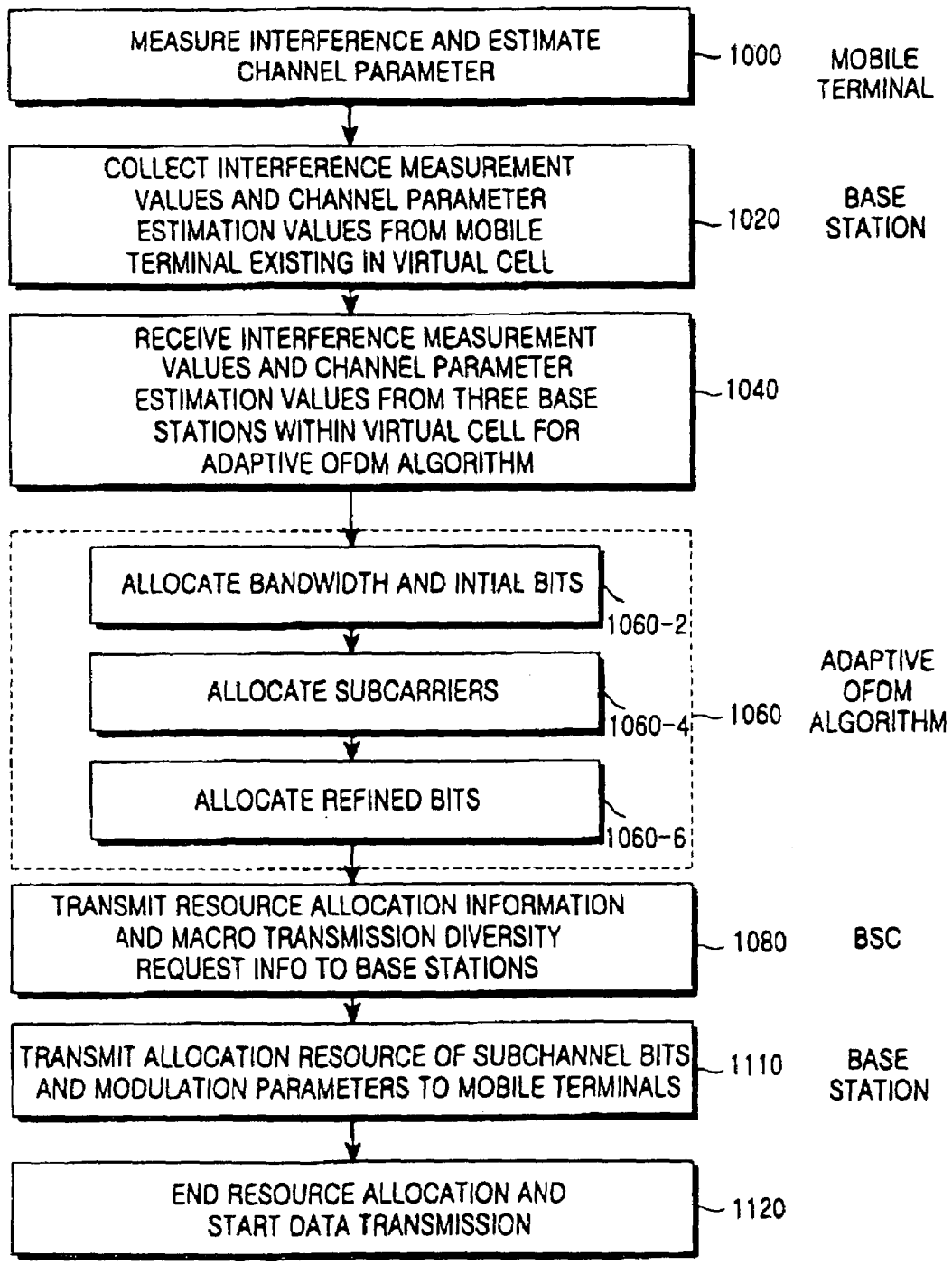
FIG. 10 is a flowchart illustrating a procedure for allocating resources of a virtual cell in an OFDM mobile communication system according to an embodiment of the present invention.

FIG. 10 is a flowchart illustrating a procedure for allocating resources of a virtual cell in an OFDM mobile communication system according to an embodiment of the present invention. Referring to FIG. 10, in step 1000, each active mobile terminal located in the virtual cell measures interference based on downlink signals from adjacent base stations and estimates channel parameters. The active mobile terminal transmits the interference measurement values and the channel parameter estimation values to three base stations. In step 1020, each base station collects interference measurement values and channel parameter estimation values from the active mobile terminals existing in the virtual cell. Each base station transmits the collected interference measurement values and channel parameter estimation values to a base station controller. The base station controller can be defined as a base station controller that manages all base stations forming the virtual cell. In step 1040, the base station controller is provided with channel measurement values and channel parameter estimation values from the three base stations forming the virtual cell in order to perform adaptive resource allocation on the virtual cell. An algorithm used to perform adaptive resource allocation on the virtual cell is referred to as "adaptive OFDM algorithm."

Thereafter, in steps 1060-2 to 1060-6, the base station controller allocates resources for the virtual cell by the adaptive OFDM algorithm. That is, the base station controller allocates a frequency bandwidth and initial bits in the virtual cell in step 1060-2, and allocates subcarriers in step 1060-4. Finally, the base station controller allocates refined bits in step 1060-6. A detailed description of the steps 1060-2 to 1060-6 will be made later. The adaptive OFDM algorithm can be performed by either the base station controller or a separate structure that is not defined by the present invention.

If resource allocation on the virtual cell is performed by the adaptive OFDM algorithm, in step 1080, the base station controller transmits the allocated resource information and macro transmit diversity (MTD) request information to the base stations forming the virtual cell. Upon receiving the resource information and the macro transmit diversity request information from the base station controller, in step 1100, each base station transmits allocated resource information comprised of subchannel, bits, and modulation parameters to the active mobile terminals located in the virtual cell.

If resource allocation on the virtual cell is completed by the above-described process, the resource allocation procedure is ended in step 1120, and then the base stations and the active mobile terminals start data transmission through the allocated resources.

Figure 11:
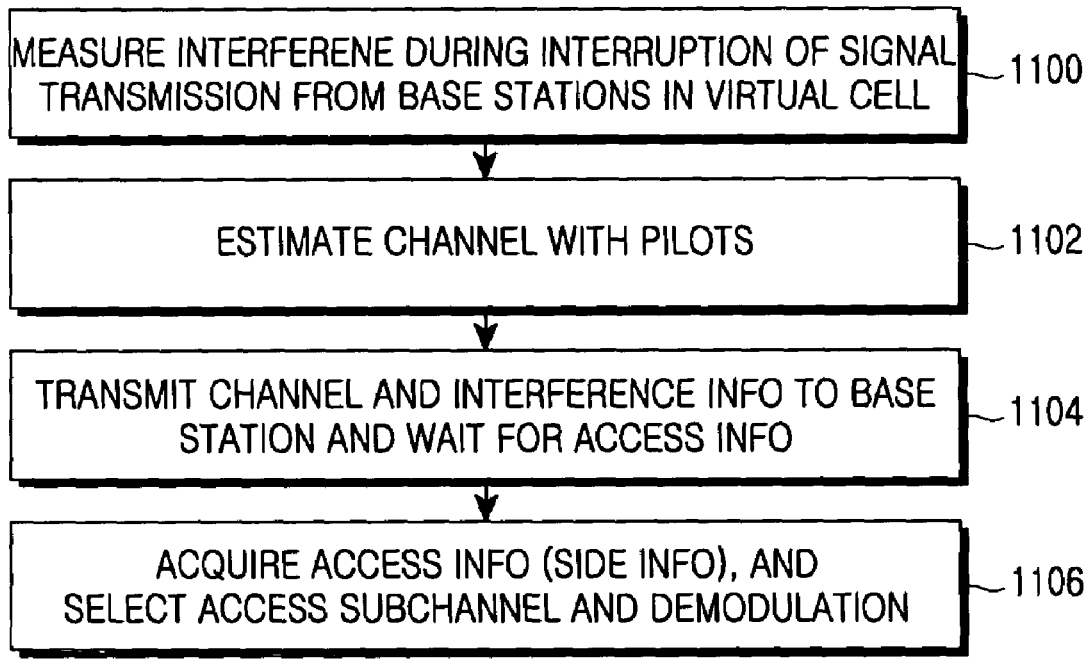
FIG. 11 is a flowchart illustrating a procedure for performing resource allocation by an active mobile terminal located in a virtual cell according to an embodiment of the present invention.

FIG. 11 is a flowchart illustrating a procedure for performing resource allocation by an active mobile terminal located in a virtual cell according to an embodiment of the present invention. Referring to FIG. 11, in step 1100, an active mobile terminal measures interference while base stations forming a virtual cell is powered off. In step 1102, the active mobile terminal estimates a channel by using pilots received from its neighboring base stations. In step 1104, the active mobile terminal transmits channel and interference information acquired in steps 1100 and 1102, to the base stations forming the virtual cell, and then waits for access information. In step 1106, the active mobile terminal acquires access information (or side information) from the base stations forming the virtual cell, and selects an access subchannel and demodulation.

Figure 12:
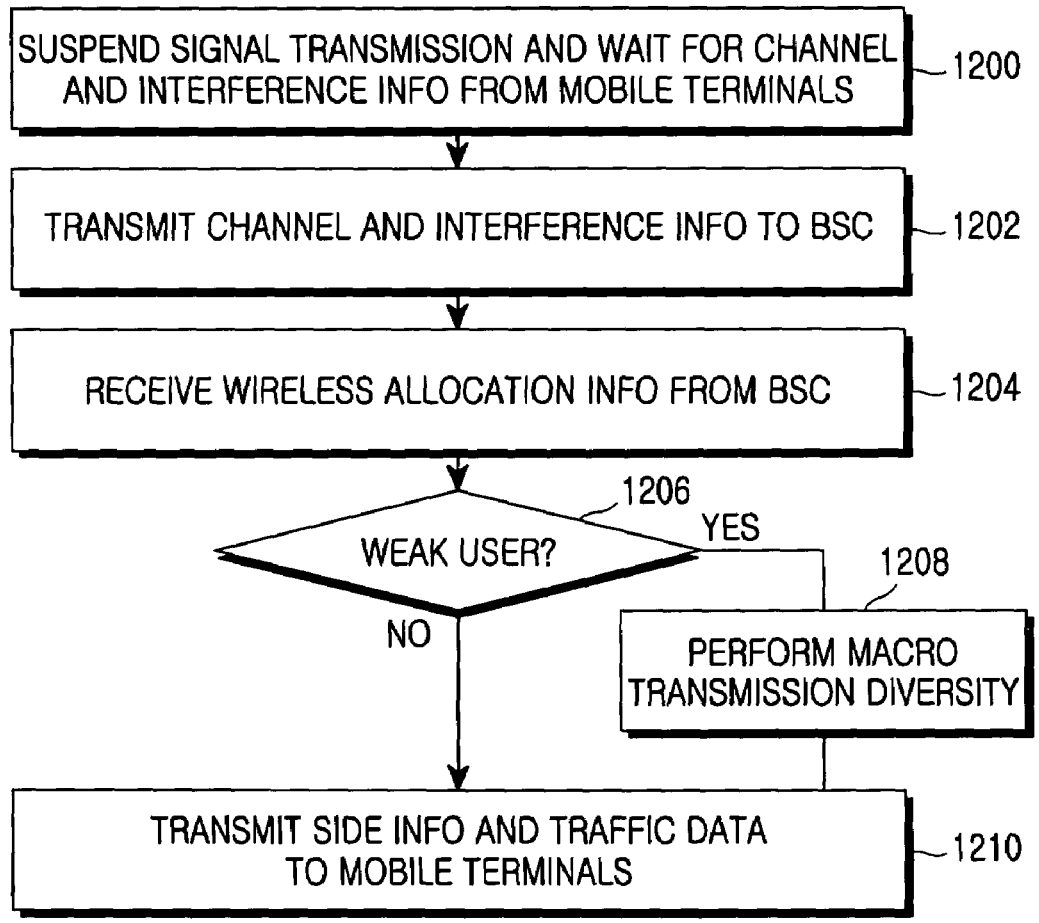
FIG. 12 is a flowchart illustrating a procedure for allocating resources of a virtual cell by a base station according to an embodiment of the present invention.

FIG. 12 is a flowchart illustrating a procedure for performing resource allocation on a virtual cell by base stations forming the virtual cell according to an embodiment of the present invention. Referring to FIG. 12, in step 1200, a base station suspends signal transmission through power off, and waits for channel and interference information from active mobile terminals located in a virtual cell. Upon receiving the channel and interference information, the base station transmits the channel and interference information to a base station controller, in step 1202. If a resource allocation procedure is performed by the channel and interference information, the base station controller transmits wireless allocation information acquired by the resource allocation procedure to the base station. The base station then receives the wireless allocation information from the base station controller in step 1204, and determines in step 1206 whether a corresponding mobile terminal (or user) is located in a diversity-requested region in the virtual cell. If the mobile terminal is located in the diversity-requested region, the base station performs macro transmit diversity in step 1208, and then proceeds to step 1210. Otherwise, if diversity is not requested, the base station proceeds directly to step 1210. In step 1210, the base station transmits side information and traffic data to the active mobile terminals located in the virtual cell.

2.3 Embodiment

An embodiment of the present invention will now be described with reference to a downlink OFDM system having K users and N subcarriers. The users can transmit multimedia data such as voice or video at a desired data rate Rk. A bandwidth of each subcarrier is much narrower than coherent bandwidth of a channel, so fading is flat at each subcarrier. A base station can determine an instantaneous channel characteristic of the links formed by all base stations and mobile terminals, as far as the channel is changed relatively slow. It will be assumed herein that channel information including shadowing, selective fading, and CCI of each subchannel in base stations forming a virtual cell is completely known. In addition, macro diversity in a virtual cell can be readily realized by transmitting the same data over the same subchannels by three sectored antennas of three sectors. A total of N subchannels are selectively, adaptively allocated to K active users in the virtual cell according to the channel information. One user can occupy one subcarrier, and allocation information is transmitted to mobile terminals over their dedicated channels. Each sector satisfies a service level requested by each user, and mobile terminals can extract their data from received OFDM symbols.

As described above, the present invention minimizes an entire power transmitted in the virtual cell, while satisfying a service request of each user in each sector. This is a goal of all mobile communication system. Equation (1) below represents that a sum of transmission power used by all mobile terminals existing in the virtual cell must be minimized.

$$\min \sum_{k=1}^{K} \sum_{n=1}^{N} P_{k,n} \quad \text{Equation (1)}$$

$$P_k = \sum_{n=1}^{N} c_{k,n} \forall k \in \{1, 2, \ldots, K\}, P_{e,n} \leq SER_k$$

In Equation (1), each subcarrier is used by only one mobile terminal at one time slot, $P_{k,n}$ represents power transmitted at an $n^{th}$ subcarrier of a $k^{th}$ mobile terminal, $c_{k,n}$ represents a number of MQAM (M-ary Quadrature Amplitude Modulation) bits, and $P_{e,n}$ represents a symbol error rate at an $n^{th}$ subcarrier occupied by a $k^{th}$ mobile terminal, required QoS of which is satisfied. In addition, k represents a number of active mobile terminals located in the same virtual cell, and N represents a number of subcarriers available for the same virtual cell. A second formula in Equation (1) represents conditions for minimizing the sum of transmission power used by all mobile terminals. In the second formula, $$P_k = \sum_{n=1}^{N} c_{k,n}$$

is a first condition representing that the sum of data rates of all mobile terminals should be equal to $R_k$, and $\forall k \in \{1, 2, \ldots, K\}$, $P_{e,n} \leq SER_k$ is a second condition representing that $P_{e,n}$ must be smaller than a symbol error rate $SER_k$.

It will be assumed herein that non-encoded transmission is considered and adaptive MQAM constellation is used for the entire frequency band. In particular, based on additive white Gaussian noise (AWGN) and Gaussian approximation, a symbol error rate (or bit error rate when gray coding is used) of MQAM transmission at high signal-to-interference plus nose ratio (SINR) and high signal constellation can be approximated as represented by Equation (2). That is, $P_{e,n}$ of Equation (1) can be approximated as represented by Equation (2).

$$P_{e,n} \approx 4Q\sqrt{\frac{3 \cdot SINR_{k,n}}{M_{k,n} - 1}} \quad \text{Equation (2)}$$

In Equation (2), a symbol error rate of a subchannel is related to SINR and a modulation level. $M_{k,n}$ represents a modulation level of an $n^{th}$ subchannel occupied by a $k^{th}$ mobile terminal, Q(·) represents normal probability integral, and $SINR_{k,n}$ represents SINR of an $n^{th}$ subchannel occupied by a $k^{th}$ mobile terminal.

In order to apply Equation (2) to Equation (4) below, a parameter proposed by the present invention satisfies Equation (3).

$$\Gamma_{k,n} = \sqrt{\frac{3 \cdot SINR_{k,n}}{M_{k,n} - 1}} = Q^{-1}\left(\frac{P_{e,n}}{4}\right) \quad \text{Equation (3)}$$

This is because average power of QAM symbols depends upon a minimum distance $d_{min}$ between two points on a signal constellation. The average power can be approximately determined by $$P_{k,n}(c_{k,n}) \approx \frac{2^{c_{k,n}} - 1}{6} d_{k,n}^2, c_{k,n} \in \{2, 3, 4, 5, 6\} \quad \text{Equation (4)}$$

Here, it is assumed that a modulation level moving to a subchannel having a high-energy channel characteristic (i.e., channel gain and interference) exists between 4 QAM and 64 QAM. In addition, in an $n^{th}$ subchannel of a $k^{th}$ mobile terminal, a minimum distance $d_{k,n}$ on a constellation is determined by $$d_{k,n} = \sqrt{\frac{2\Gamma_{k,n}^2(N_0 + I_{k,n})}{|H_{k,n}|^2}} \qquad \text{Equation (5)}$$

where $\Gamma_{k,n}$ is from Equation (3), $N_0$ is noise power, $I_{k,n}$ is interference power, and $H_{k,n}$ is channel frequency response.

2.3.1 Adaptive OFDM Algorithm

In an actual system, in order to allocate subcarrier, bits and power in real time with low complexity, an adaptive OFDM algorithm for determining the number of subchannels for each user, performing subchannel selection on each user, and performing power allocation joint and optimal allocation based on bits and Water filling can be divided into the following three stages.

(1) First Stage: Bandwidth Allocation and Initial Bit Allocation

In the first stage, a process of determining a bandwidth will be described. In a wireless environment, due to an effect of a near-far problem, users located far away from a base station acquire a lower SINR than other users. These users need higher power in order to transmit the same data as the other users transmit. If sufficient subchannels satisfying a required minimum data rate are allocated to the respective users, it is preferable to reduce entire transmission power in order to allocate additional subchannels to the users having low average SINR. It is proven that if flat transmission power spectral density and modulation level allocation are used along with subchannel allocation, it is difficult to reduce data throughput of a multiuser OFDM system as compared with when the subchannel allocation method is used. For example, it is assumed that a shadow fading gain of a $k^{th}$ user is defined as $\alpha_k$, a required minimum data rate is set to $R^k_{min}$, and a $k^{th}$ user occupies $m_k$ subcarriers. Therefore, after a number of subcarriers for a $k^{th}$ user is determined, bit allocation is defined as $$c_{k,n} = \begin{cases} \left\lfloor \frac{R_k}{m_k} \right\rfloor + 1 & \text{the } R_k - \left\lfloor \frac{R_k}{m_k} \right\rfloor \times m_k \text{ best subcarriers} \\ \left\lfloor \frac{R_k}{m_k} \right\rfloor & \text{other subchannels} \end{cases} \qquad \text{Equation (6)}$$

Equation (6) is needed by the first processor 702 of FIG. 7 to perform initial bit allocation in the step 1060-2 of FIG. 10.

Based on Equation (6), an average total transmission power of a $k^{th}$ user (or mobile terminal) is calculated by $$P_{k,total} = \frac{\left(R_k - \left\lfloor \frac{R_k}{m_k} \right\rfloor \cdot m_k\right)}{\alpha_k} \times P\left(\left\lfloor \frac{R_k}{m_k} \right\rfloor + 1\right) + \frac{\left(m_k - R_k + \left\lfloor \frac{R_k}{m_k} \right\rfloor \cdot m_k\right)}{\alpha_k} \times P\left(\left\lfloor \frac{R_k}{m_k} \right\rfloor\right) \qquad \text{Equation (7)}$$

The present invention is aimed at determining a set of $m_k$, where k=1, . . . , K. Equation (8) below indicates that minimum transmission power for a $k^{th}$ mobile terminal must be allocated based on Equation (6) and Equation (7).

$$\min \sum_{k=1}^{K} P_{k,total} \qquad \text{Equation (8)}$$

In Equation (8), $$\sum_{k=1}^{K} m_k = N \text{ and } m_k \in \left\{ \left\lceil \frac{R^k_{min}}{R_{max}} \right\rceil, \ldots, N \right\},$$

where $R_{max}$ represents the maximum number of modulated bits on a subcarrier. If $R_{max}$ is 6, optimal distribution of subcarriers between users can be determined by the procedure represented by the following algorithm.

---

Initialization $m_k = \left\lceil \frac{R_k}{R_{max}} \right\rceil$, k = 1, . . . , K, While $$\sum_{k=1}^{K} m_k < N \text{ do}$$

$\hat{P}_k = P_{k,total}(m_k + 1) - P_{k,total}(m_k)$, k = 1, . . . , K, $l = 1 \leq \overset{\arg\min}{k} \leq K \ \hat{P}_k$ $m_l = m_l + 1$ End while

---

The above procedure, a procedure for achieving Equation (8), determines a bandwidth ("# of subcarrier" in FIG. 7) and corresponds to the step 1060-2 of FIG. 10 performed by the first processor 702 of FIG. 7.

(2) Second Stage: Subcarrier Allocation

In the second stage, a process of allocating subcarriers and bits will be described. In the present invention, a channel characteristic parameter $G_{k,n}$ of an $n^{th}$ subcarrier for a $k^{th}$ user is defined as $$G_{k,n} = \frac{\sqrt{N_0 + I_{k,n}}}{|H_{k,n}|} \qquad \text{Equation (9)}$$

The parameter $G_{k,n}$ determined by Equation (9) represents channel information for determining order of channels according to their qualities.

After parameters $G_{k,n}$ for sequential arrangement are rearranged as illustrated in FIG. 6, a subcarrier index of each user is allocated by $\hat{G}_{k,n}$,l. Here, an $l^{th}$ subcarrier can be used by one user at one time slot. Particularly, subcarrier allocation is performed by the following algorithm.

---

Initialization $\Phi_k$ = null k = 1, . . . , K, and $\Phi$ = null, where $\Phi = \bigcup_{k=1}^{K} \Phi_k$ While
For k = 1, . . . , K if $l \notin \Phi$ and $m(\Phi_k) < m_k$ $l \in \Phi_k$ and $l \in \Phi$

```
            end if
        end for
end while
```

Herein, m(·) represents a number of elements in a coset. After subcarrier allocation, bit allocation is initialized as expressed by Equation (6).

(3) Third Stare: Refined Bit Allocation (Macro Transmit Diversity)

Thereafter, bit allocation is subdivided by a Water filling algorithm. Refined bit allocation for mathematical optimization of a $k^{th}$ user can be represented by $$\min \sum_{l \in \Phi_k} P_{k,l}, \ R_k = \sum_{l \in \Phi_k} c_{k,l} \text{ and } P_{e,l} \leq SER_k \qquad \text{Equation (10)}$$

Because bit allocation initialized as shown above approaches optimal bit allocation, bit allocation can be more precisely performed by searching two subcarriers. Herein, indexes are defined as l and l', and a first condition where a $k^{th}$ mobile terminal performs optimized bit allocation while using minimum transmission power is represented by $$P_{k,l}(C_{k,l}) - P_{k,l}(C_{k,l}-1) > P_{k,l'}(C_{k,l'}+1) - P_{k,l'}(C_{k,l'}) \qquad \text{Equation (11)}$$

If there is an $(l,l')^{th}$ pair, moving a 1-bit sub-channel l to a subcarrier l' reduces total transmission power of a $k^{th}$ user. Optimal bit allocation for a $k^{th}$ user, i.e., a second condition where a $k^{th}$ mobile terminal performs an optimal bit allocation while using minimum transmission power, can be obtained until Equation (12) below is satisfied.

$$\underline{\Delta P_k^+} \geq \overline{\Delta P_k^-} \qquad \text{Equation (12)}$$

In Equation (12), $$\underline{\Delta P_k^+} \geq \overline{\Delta P_k^-}$$
$$\underline{\Delta P_k^+} = \min_{l \in \Phi_k} \{P_{k,l}(c_{k,l}+1) - P_{k,l}(c_{k,l})\}$$

and $$\overline{\Delta P_k^-} = \max_{l \in \Phi_k} \{P_{k,l}(c_{k,l}) - P_{k,l}(c_{k,l}-1)\}$$

It is possible to directly calculate the minimum distance $d_{k,n}$ like the minimum distance on a signal constellation of transmission symbols of Equation (5), in order to reduce side information between a base station and a mobile terminal.

In order to improve performance of users located in a boundary region (center of a virtual cell) of cells, a macro transmit diversity technology is used, which uses a similar concept to a single frequency network (SFN) in a digital video broadcasting (DVB) system, without increasing co-channel interference affecting other virtual cells. If one user moves to the center of a shaded virtual cell illustrated in FIG. 9, reception power from a base station is decreased unless transmission power is increased. In order to satisfy required QoS, it is preferable to increase power transmitted from one base station. If base stations in the virtual cell know a channel fading gain of a user who receives a weak signal, it is possible to theoretically perform pre-equalization in order to reduce receiver complexity of a base station. In addition, it is possible to transmit the same symbol with a pre-equalization coefficient from three base stations in a virtual cell. In a frequency domain, a received signal is given $$Y_{k,n} = \qquad \text{Equation (13)}$$
$$\sqrt{\alpha_{k,n}^1} \frac{\rho_{k,n}^{1*}}{\sqrt{|\rho_{k,n}^1|}} X_{k,n} \cdot \rho_{k,n}^1 + \sqrt{\alpha_{k,n}^2} \frac{\rho_{k,n}^{2*}}{\sqrt{|\rho_{k,n}^2|}} X_{k,n} \cdot \rho_{k,n}^2 +$$
$$\sqrt{\alpha_{k,n}^3} \frac{\rho_{k,n}^{3*}}{|\rho_{k,n}^3|} X_{k,n} \cdot \rho_{k,n}^3 + N_n + Z_{k,n}$$

In Equation (13), $$\frac{\rho_{k,n}^{i*}}{\sqrt{|\rho_{k,n}^i|}} (i = 1, 2, 3)$$

represents a pre-equalization coefficient at a subcarrier with a variance 1 and $N_n$. In addition, $Z_{k,n}$ represents AWGN and co-channel interference, such as $N_0$, $I_{k,n}$ and each variance of an $n^{th}$ subcarrier for a $k^{th}$ user. That is, Equation (13) represents a condition (step 1080 of FIG. 10) of a mobile terminal using macro transmit diversity.

Therefore, reception $SINR_{k,n}$ of a $k^{th}$ user located far away from a base station is defined as $$SINR_{k,n} = \frac{\sum_{i=1}^{3} \sqrt{\alpha_k^i |\rho_{k,n}^i|} \cdot P_{k,n}}{N_0 + I_{k,n}} \qquad \text{Equation (14)}$$

That is, $SINR_{k,n}$ calculated by Equation (14) indicates reception SINR of a weak mobile terminal using macro transmit diversity.

When there is no macro transmit diversity, even though the total transmission power used for a user having a weak reception signal is increased three times, co-channel interference for an adjacent virtual cell is scarcely increased. This is because the same transmission power from three sectors is concentrated at a user who receives a weak signal at sectored antennas.

The present invention has the following effects.

First, the OFDM mobile communication system according to the present invention increases wireless resource efficiency and contributes to the convenient management of the wireless resources. That is, sectors neighboring other adjacent cells constitute a virtual cell, and the virtual cell is controlled by centralization. If instantaneous channel information is known in a virtual cell, wireless multiuser OFDM access based on multistage adaptive resource allocation is independently applied to the virtual cell. The total transmission power in the virtual cell can minimize or reduce interference affecting adjacent virtual cells, and at this moment, a service request is satisfied. Therefore, based on interference avoidance and co-channel interference suppression, the adaptive OFDM wireless access method proposed by the present invention can secure high power efficiency as well as high frequency efficiency by enabling a frequency reuse factor to approach 1. In addition, sectored antennas and beamforming technologies can be used for suppression of co-channel interference, and spectrum efficiency is improved by a multicell structure having the virtual cell concept.

Second, as the present invention receives the same signals through the same channel frequency from three base stations forming a virtual cell, an active mobile terminal can improve a transmit diversity gain.

Third, the present invention easily performs a soft handover by using macro transmit diversity.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A virtual cell management method using sectors in an orthogonal frequency division multiplexing mobile communication system including a cell structure having cells each comprised of a plurality of sectors, the cells performing data communication with mobile terminals within a corresponding cell through at least one subchannel having orthogonality, the method comprising the steps of:

forming a virtual cell with a particular one of sectors constituting a particular cell and sectors of two other cells neighboring the particular sector;

transmitting, by three base stations forming the virtual cell, an interference measurement value and a channel estimate value from a mobile terminal located in the virtual cell to a base station controller that controls the virtual cell, thereby allocating at least one wireless resource in the virtual cell;

transmitting the at least one allocated wireless resource to the three base stations so that the base stations allocate a same subchannel to each mobile terminal located in the virtual cell; and transmitting same data over the allocated subchannel.

2. The virtual cell management method of claim 1, wherein the subchannel is dynamically allocated within an entire frequency bandwidth that is usable in the virtual cell.

3. The virtual cell management method of claim 2, wherein the entire frequency bandwidth is reused in another virtual cell neighboring the virtual cell.

4. The virtual cell management method of claim 1, further comprising the step of receiving the same data transmitted from the base stations over the allocated subchannel.

5. The virtual cell management method of claim 1, wherein the at least one wireless resource includes at least one of frequency bandwidth, initial bits, subcarriers, and refined bits.

6. An apparatus for allocating resources of a virtual cell formed with a particular sector forming a particular cell and sectors of two other cells neighboring the particular sector, in an orthogonal frequency division multiplexing mobile communication system having a cell structure formed by cells each comprised of a plurality of sectors, the cells performing data communication with mobile terminals within a corresponding cell through at least one subchannel having orthogonality, the apparatus comprising:

mobile terminals, located in the virtual cell, for transmitting, to base stations, interference information measured during a power off of the base stations and channel estimate information estimated using pilot signals from the base stations, and performing demodulation with at least one subchannel based on access information from the base stations;

the base stations for transmitting the interference information and the channel estimate information from the mobile terminals to a base station controller that controls the virtual cell, receiving wireless allocation information from the base station controller, transmitting the access information to the mobile terminals, allocating a same subchannel to each mobile terminal located in the virtual cell, and then transmitting same data over the allocated subchannel; and a resource allocator for allocating wireless resources in the virtual cell based on the interference information and the channel estimate information transmitted through the base station controller, and transmitting the allocated wireless allocation information to the base stations through the base station controller.

7. The apparatus of claim 6, wherein the subchannel is dynamically allocated within an entire frequency bandwidth that is usable in the virtual cell.

8. The apparatus of claim 7, wherein the entire frequency bandwidth is reused in another virtual cell neighboring the virtual cell.

9. The apparatus of claim 6, wherein the wireless resources include at least one of frequency bandwidth, initial bits, subcarriers and refined bits.

* * * * *